United States Patent Office 3,629,206
Patented Dec. 21, 1971

3,629,206
CURING OF LIQUID POLYTHIOPOLYMERCAPTAN POLYMERS
Harry B. Stephenson and William J. Clapson, Joplin, Mo., and Edwin L. Wolkar, Baxter Springs, Kans., assignors to Eagle-Picher Industries, Inc., Cincinnati, Ohio
No Drawing. Filed July 16, 1969, Ser. No. 842,328
Int. Cl. C08g 25/00
U.S. Cl. 260—79
12 Claims

ABSTRACT OF THE DISCLOSURE

Curing of liquid organic polythiopolymercaptan polymers with curing systems which are capable of affecting rapid cures at room temperatures and which will produce white or light-colored elastomeric or plastic products amenable to tinting or coloring. The curing system consists essentially of an alkyl thiuram polysulfide and at least one lead salt selected from the group consisting of a basic lead salt, a normal lead salt and mixtures thereof.

BACKGROUND OF THE INVENTION

Liquid organic polythiopolymercaptan polymers, which often are referred to by their trademark, "Thiokols," are well-known. The basic technique by which the liquid polymers are produced is described in Patrick and Ferguson U.S. Pat. 2,466,963 issued on Apr. 12, 1949. As disclosed in that patent, polythiopolymercaptan polymers (sometimes referred to herein as polysulfide polymers) can be prepared having molecular weights on the order of about 500 to about 25,000 and which are viscous liquid having viscosities within the range of about 300 to 100,000 centipoises. The liquid polymers are used for a wide variety of commercial applications. When cured or hardened, they form rubber-like solids having useful properties. They are inert to oil and to most organic solvents as well as to water, mild acids and alkalies, and are not affected by ozone or sunlight. They are tough and resilient and retain their flexibility at extremely low temperatures. Moreover, they are impermeable to gases and moisture, and adhere tenaciously to such diverse materials as glass, metals, plastics, wood, leather and fabrics. Because of these valuable properties, they are used as impregnating, sealing, caulking and coating materials, as well as for a variety of special uses, such as gasoline hose, printers' rolls, and potting compounds for electrical components.

Polysulfide polymers are characterized by recurring polysulfide linkages between organic radicals having at least two primary carbon atoms for connection to disulfide linkages. Thus, disulfide polymers have a general structure corresponding to the formula $HS(RSS)_nRSH$, in which R indicates an organic radical, e.g. a divalent aliphatic radical such as diethylformal, and $n$ is an integer which, for the liquid polymers is in the general range of 2 to 60.

The liquid polysulfide polymers are usually produced in commercial practice by the condensation of an organic dihalide radical, corresponding to R, with a polysulfide in the presence of a polyfunctional cross-linkage agent such as trichloropropane. The polymer so formed is subsequently split to form a liquid polymer of lower molecular weight, as described in previously mentioned Pat. No. 2,466,963. The liquid polymer is reconverted to solid form in use by a repolymerization process referred to as curing.

The liquid polysulfide polymers are to be distinguished from the solid polymers both in their chemical and physical properties. Generally speaking, curing of the liquid and solid polymers is quite different, different curing agents being used, at different curing conditions. Thus, whereas a solid polymer may be cured at given conditions in the presence of a certain curing agent, a liquid polymer may remain uncured at those conditions. In general, the liquid forms are more selective in their response to curing than the solid polymers.

For certain purposes, the liquid polymer may be cast in a mold to which heat is then applied for curing, but there are many applications wherein it is desired or requisite that the liquid polymer be cured rapidly, at room temperature, without the application of a mold to confine the liquid polymer during curing. By way of illustration, these conditions are imposed where the liquid polymer is used in architectural caulking.

In the past, the curing of liquid polysulfide polymers has usually been effected with lead peroxide, $PbO_2$, as the curing agent. This technique is described in the previously mentioned Patrick et al. Pat. No. 2,466,963. Lead peroxide promotes rapid curing at room temperature, and usually the cure is substantially complete in a period of a few hours or less. However, as a curing agent lead peroxide presents the real limitation that the cured product inevitably has a dark reddish brown color, which cannot be completely masked with conventional pigmentation or tinting additives. In some applications it is desirable to have a light or white colored material which can be tinted to provide a desired pastel color rather than the dark color which alone is possible with the conventional lead peroxide curing system. Other known curing agents produce such colors that they require an opacifier to produce "white cures" and this increases production costs. Curing agents which will produce light-colored cured products when mixed with the liquid polymers have previously been known, but such systems have usually required elevated temperatures to complete the cure and do not cure adequately at room temperature, or do not provide the physical properties that are desired for some applications. In this connection, it may be noted that, for most systems, the rate of cure doubles for every 17° F. increase in curing temperature, and from this it will be seen, for example, that a cure which is complete in one hour at 170° F. will require, roughly speaking, about 64 hours to cure at 68° F.

SUMMARY OF THE INVENTION

We have discovered certain curing systems which will convert liquid organic polysulfide polymers to solid form in a short time, i.e., in a period between several minutes or one or more hours and about one or two days, at room temperature or ambient temperatures without the application of heat from an external source and which, moreover, will produce a white or light-colored cured product.

In the curing systems we have discovered, specialized combinations of alkyl thiuram polysulfides and lead compositions are utilized. Surprisingly, it has been found that if these special additives are used in combination with each other to cure liquid polysulfides they demonstrate a synergistic effect over a wide range of concentrations and loadings, whereby various properties and rates of cure may be obtained as desired, but if they are used individually with liquid polysulfides they demonstrate little or no curing effect at room temperatures or produce undesirably colored products.

In accordance with this invention, such curing of liquid polysulfide polymers is obtained by a mixture of certain alkyl thiuram polysulfides and certain lead compositions, particularly lead salts. "Salt" as used herein means the reaction product of a lead compound and an acidic material. These salts are selected from the class consisting of basic lead salts and normal lead salts of organic and inorganic acids. This class of lead salts, in combination with the alkyl thiuram disulfides, displays unique qualities in curing liquid polysulfide polymers. In contrast to the results obtained by curing with these lead salts in combination with thiurams, other rather similar oxides and salts such as calcium oxide, calcium hydroxide, barium oxide, barium hydroxide, barium carbonate, magnesium oxide, magnesium carbonate, lead monoxide and lead dioxide, are either much less effective with the thiurams, or give some discoloration, and can actually be deleterious rather than contributing to a good cure. On the other hand, certain lead salts when used individually or in a mixture in accord with this invention, behave synergistically with the alkyl thiuram disulfide to give well-cured, light-colored stocks in short curing times. It has been found essential to employ the alkyl thiuram disulfides in the combination in accordance with this invention. The alkyl thiuram monosulfides have been found not to provide curing at room temperatures.

In the following detailed description of the practice of this invention, the specific curable polysulfide polymers used for purposes of illustration are commercially available grades known as LP–2 and LP–32, produced and sold by Thiokol Chemical Corporation, Trenton, N.J. It will be understood that these particular liquid polymers are only representative of the various grades of organic liquid polysulfide polymers which are available and with which the curing systems we have invented may be used. For example, other commercially important liquid polymers are particularly described in articles by Fettes and Jorczak published in "Industrial and Engineering Chemistry," vol. 42, p. 2217 (1950) and vol. 43, p. 324 (1951). The LP–2 polymer has a molecular weight of about 4000, a viscosity of about 400 poises at 25° C., and contains 2 mol percent trifunctional groups which are available for molecular cross-linking. The LP–32 polymer has a molecular weight of about 4000, a viscosity of about 400 poises at 25° C., and contains 0.5 mol percent trifunctional groups which are available for molecular cross-linking. Other higher molecular weight grades and types of liquid polysulfide polymers may be employed with results similar to those achieved for LP–2, although optimal dosages of the curative mixture may be somewhat different with each. When solid elastomeric products are desired, it has been found that the average molecular weight of the liquid polysulfide polymer is preferably greater than 1000, i.e., on the order of at least about 4000 average molecular weight when the curing agents are, for example, present in total amounts of about 15 to about 32 parts by weight per 100 parts by weight of liquid polymer. When the mentioned amounts of curing agents or even higher amounts are used to cure liquid polysulfide polymers having an apparent average molecular weight of about 1000 and a cross-linking functionality of about 0.5 to about 2 mol percent (i.e., LP–3 and LP–33 grades) it has been found that the cured products are not elastomeric, but rather soft solids which are kneadable or workable. Thus, when solid elastomers are desired, it is preferred to use liquid polythiopolymercaptan polymers having an average molecular weight on the order of about 4000 to about 25,000 and having viscosities within the range of about 400 to about 100,000 centipoises.

Several examples are given hereinafter to illustrate the curing systems we have discovered. All quantities of components in the tables are given in parts by weight specified in relation to one hundred parts by weight of the polysulfide polymer which is to be cured. All cures in the tables were conducted at room or ambient temperature, i.e., about 21° C. to about 23° C. Where there is nothing reported under a subheading of "Properties" for a particular example in the tables, this means that no determination was made for that sub-heading.

Table I following illustrates the curing of a number of formulations of LP–2 grade liquid polysulfide polymers with a combination of basic lead silicate and tetramethyl thiuran disulfide which has been abbreviated as TMTD.

TABLE I

| Stock formulation Example | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| LP–2 liquid polymer | 100 | 100 | 100 | 100 | 100 | 100 | 100 | 100 | 100 | 100 | 100 | 100 | 100 | 100 | 100 | 100 |
| Basic lead silicate | 20 | 16 | 24 | 20 | 16 | 12 | 24 | 20 | 16 | 12 | 8 | 24 | 20 | 16 | 12 | 8 |
| TMTD | 5 | 5 | 6 | 6 | 6 | 6 | 7 | 7 | 7 | 7 | 7 | 8 | 8 | 8 | 8 | 8 |
| Dibutyl phthalate | 7 | 7 | 7 | 7 | 7 | 7 | 7 | 7 | 7 | 7 | 7 | 7 | 7 | 7 | 7 | 7 |
| Properties: | | | | | | | | | | | | | | | | |
| Working life | ½ | ⅚ | 1½ | ⅔ | 1 | ⅚ | ½ | ⅔ | ¾ | ⅚ | ⅔ | ⅔ | ½ | ⅔ | ¾ | ⅚ |
| Tack-free set time | 2⅔ | 2½ | 1⅚ | | | | | 1⅔ | 1⅔ | | ⅔ | 2⅔ | 3½ | | | 1½ |
| Cure time | <16 | <16 | 3 | >1½ | >2 | >2 | >3 | 2½ | 2 | 1¾ | 1 | 6 | 3½ | <16 | <16 | 1½ |
| Color | | | | | Yellow | | | | | | | | White | | | Cream |
| Shore A hardness: | | | | | | | | | | | | | | | | |
| At 24 hours | 20 | 16 | 48 | 33 | 40 | 15 | 50 | 47 | 42 | 45 | 30 | 25 | 30 | 35 | 44 | 15 |
| At 42 days | | | | | | | | | | | | 30 | | | | |

The working life, tack-free set time and cure time of each sample was determined and expressed in hours. In Table I and the remaining tables, these terms are used to define the stages of curing. The time required to achieve a non-pourable consistency is known as "pot life" or "working life" which is the first stage of curing. In the second stage, the stock material passes from a thick, unpourable sticky substance to a tack-free but still plastic state. The time interval for this second transformation is known as the "tack-free set time." In the third stage, the material changes from a plastic kneadable consistency to an elastomeric state and the time required to pass through the first, second and this third stage is referred to as the "cure time." This invention provides for solid cured products including (1) elastomeric solids (i.e., "third stage" or cured products) which are rubber-like or (2) deformable tackfree plastic solids (i.e., "second stage" cured products).

The hardness of the polymer at different times after addition of the curing agents was determined by the standard Shore A Hardness Test which is well-known in the rubber industry. A Shore durometer having a pointer is forced into the test specimen. A scale from 0 to 100 units reects the specifimen hardness, the higher readings indicating harder cures were obtained.

In blending each stock formulation, in Table I and subsequent tables, dibutyl phthalate (DBP) was used in varying proportions. This material is employed, and acts solely as an aid in preparing a smooth, uniform paste of lead compound and the TMTD so that the curing agents may be more quickly mixed with the liquid polymer. The lead compound and the thiuram were added in the proportions indicated to DBP to form a paste, which was thoroughly mixed by milling in a conventional three roll paint mill. The resultant paste was then stirred into the polymer to initiate curing. It will be appreciated that vehicles such as DBP are conventional in forming pastes, and that other such vehicles (e.g. "Arochlor," a polychlorinated polyphenyl) may be used for that purpose. A compatible tint or dye may be incorporated into the polymer to provide a desired color which will not be masked by the curing agents.

For purposes of comparison with Table I, a conventional liquid polysulfide curing system comprising a mixture of 100 parts LP–2, 16 parts DBP, and 8 parts $PbO_2$, will cure to a Shore A hardness of about 25 in 4 hours. The lead compound-thiuram system has a rate of cure of about the same order as that of the lead peroxide system. However, in each instance the lead compound-TMTD cured product is light-colored, whereas the lead peroxide cured material is a dark reddish brown color.

Table I illustrates the effect on hardness by variations in the proportions of the lead compound and TMTD. It must be realized that the hardness of the cure is not the only criterion of the quality of the cure, because for certain purposes relatively soft cures, particularly which retain their adherency, are desirable.

Cures for all examples in Table I which demonstrates a curing system of basic lead silicate and TMTD were obtained over a period of about 1 to about 16 hours at room temperature. As shown in Examples 1 through 16, the total amounts of the curing ingredients consisting essentially of basic lead silicate and TMTD can vary over a wide range, i.e., from about 15 to about 32 total parts by weight based upon 100 parts by weight of polymer. In this range of total parts by weight, the basic lead silicate is used in varying amounts of 8 to 24 parts by weight and the TMTD is varied from 4 to 8 parts by weight. When it is desired to obtain a rather firm while-colored cured product, the total part by weight of the curing system ingredients is in the range of about 20 to about 32 and the TMTD: polymer weight ratio is at least on the order of about 8:100 with varying amounts of basic lead silicate from about 12 to 24 parts by weight per 100 parts polymer. This is demonstrated by Examples 12–15 in Table I where the Shore A hardnesses for these ranges of ingredients in the presence of conventional vehicle dibutyl phthalate was between about 32 and 44; and the cured products were white.

With further reference to Table I, Examples 1–11 illustrate that yellow-colored cured products can be obtained having Shore A hardnesses of about 16 to 50 with varying ranges of ingredients. However, the range of proportions shown in this table and the remaining tables is by way of illustration of the practice of this invention and not limitation. Over the entire range of proportions shown, basic lead silicate and TMTD have been found to produce white or yellow cured products, at room temperatures, having Shore A hardnesses in a range of about 15 to about 50 in a short period of time, i.e., less than 24 hours.

Table II illustrates the curing capabilities of a system consisting essentially of tri-basic lead sulfate and TMTD in varying total proportions by weight and varying ratios of ingredients. Examples 17 through 25 illustrate that basic lead sulfate and TMTD in total parts by weight in a range of about 12 to about 32 and in a ratio of ingredients in the range of about 1:1 to about 4:1 of the basic lead sulfate to TMTD can be employed successfully to obtain light-colored cured products over a period between about 1 hour and 16 hours. A curing system containing about 20 to about 32 total parts by weight of the ingredients to 100 parts by weight of the polymer produces white or light-colored products and Shore A hardnesses within the range of about 25 to about 45. However, softer cures have been obtained within 24 hours where the curing components amounted to less than about 20 parts by weight. For example, with reference to Examples 17 and 24–25, cures were obtained within a 24 hour period and the Shore A hardnesses obtained were on the order of 10–20. Similar to the TMTD:basic lead silicate system of Table I, 8 parts by weight TMTD:100 parts by weight polymer in the presence of about 4 to about 24 parts by weight of tri-basic lead sulfate produced white or light-colored cured products.

TABLE II

| Stock formulation Example | 17 | 18 | 19 | 20 | 21 | 22 | 23 | 24 | 25 |
|---|---|---|---|---|---|---|---|---|---|
| LP-2 liquid polymer | 100 | 100 | 100 | 100 | 100 | 100 | 100 | 100 | 100 |
| Tri-basic lead sulfate | 8 | 24 | 24 | 20 | 16 | 24 | 8 | 7 | 4 |
| TMTD | 6 | 7 | 6 | 6 | 6 | 8 | 8 | 8 | 8 |
| Dibutyl phthalate | 7 | 7 | 7 | 7 | 7 | 7 | 7 | 7 | 7 |
| Properties: | | | | | | | | | |
| Working life | 1¾ | ¼ | ½ | ⅓ | ⅓ | ¼ | ¼ | | |
| Tack-free set time | | | ¾ | | | | 3½ | | |
| Cure time | <16 | 1 | 1 | <16 | <16 | ¾ | 4½ | <16 | <16 |
| Color | Cream | | Yellow | | | White | White | Cream | Cream |
| Shore A hardness: | | | | | | | | | |
| At 24 hours | 14 | 45 | 47 | 36 | 35 | 21 | 30 | 10 | 20 |
| At 9 days | 30 | 50 | 49 | 42 | 41 | 25 | | 33 | 24 |

Table III illustrates that varying amounts of mono-basic lead borate in combination with TMTD can also be used as a curing system for the liquid polymer. Again, a wide range of total amounts of the curing system can be used as illustrated by Examples 26–40. As shown, total amounts of mono-basic lead borate and TMTD in a range of about 14 to about 32 parts by weight where the ratio of ingredients is in the range of 6:1 to about 1:1, have been used successfully to cure the polymer. Examples 33–40 demonstrate that white-colored cured products can be obtained where the total amount of curing ingredients is in the range of about 16 to about 32 parts by weight based upon 100 parts of the polymer and the TMTD is present in an amount of at least about 7 to 8 parts by weight based upon 100 parts by weight of polymer. All cures as shown in the table were effected within a period of about 1 hour to about 16 hours.

TABLE III

| Stock formulation Example | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|
| LP-2 liquid polymer | 100 | 100 | 100 | 100 | 100 | 100 | 100 | 100 | 100 | 100 | 100 | 100 | 100 | 100 | 100 |
| Monobasic lead borate | 24 | 24 | 24 | 20 | 16 | 12 | 8 | 24 | 20 | 16 | 24 | 20 | 16 | 12 | 8 |
| TMTD | 4 | 5 | 6 | 6 | 6 | 6 | 6 | 7 | 7 | 7 | 8 | 8 | 8 | 8 | 8 |
| Dibutyl phthalate | 7 | 7 | 7 | 7 | 7 | 7 | 7 | 7 | 7 | 7 | 7 | 7 | 7 | 7 | 7 |
| Properties: | | | | | | | | | | | | | | | |
| Working life | ½ | ⅓ | ⅓ | ⅓ | ½ | ⅔ | 1½ | ⅙ | 1½ | ½ | ⅓ | ¼ | ⅙ | ½ | 1 |
| Tack-free set time | 2 | 1 | 4 | 2 | 5 | 4½ | 5 | 1¼ | 3½ | | 4¼ | | | | 1 |
| Cure time | 4 | 1½ | 4 | 2½ | 6 | <16 | <16 | 4¾ | 4½ | <16 | <16 | <16 | <16 | <16 | 1⅙ |
| Color | | | | Yellow | | | | | | | White | | | | |
| Shore A hardness: | | | | | | | | | | | | | | | |
| At 24 hours | 13 | 23 | 40 | 25 | 26 | 22 | 22 | 35 | 45 | 24 | 25 | 25 | 15 | 20 | 10 |
| At 6 days | | | | | | | | | | | | | 35 | 25 | |
| At 9 days | 13 | | 40 | | | | | | | | | 40 | | | |
| At 45 days | | | | | | | | | | | | | | | 10 |

Table IV illustrates a number of examples wherein a dibasic lead phthalate was used in combination with TMTD successfully to cure a liquid polymer within a short period of time, namely, about 1 to about 16 hours, with the resultant product being of a light or white-colored nature. Examples 41–51 show that the dibasic lead phthalate and TMTD can also be used in a total amount in the range of curing ingredients from about 16 to about 32 parts by weight of curing system to 100 parts polymer. Again, white or light-colored cured products were obtained where the total amount of curing ingredients varied in the range of about 20 to about 32 parts based upon 100 parts by weight of the polymer and the TMTD is present in an amount of about 6-8 parts by weight per 100 parts by weight polymer. See for example, Examples 43-45.

this invention are envisioned to be within the scope hereof. Moreover, it is to be understood, that mixtures of lead salts or thiuram disulfides can be employed to achieve the advantages of this invention.

TABLE IV

| Stock formulation Example | 41 | 42 | 43 | 44 | 45 | 46 | 47 | 48 | 49 | 50 | 51 |
|---|---|---|---|---|---|---|---|---|---|---|---|
| LP-2 liquid polymer | 100 | 100 | 100 | 100 | 100 | 100 | 100 | 100 | 100 | 100 | 100 |
| Dibasic lead phthalate | 24 | 24 | 24 | 20 | 16 | 12 | 24 | 16 | 12 | 24 | 8 |
| TMTD | 4 | 5 | 6 | 6 | 6 | 6 | 7 | 7 | 7 | 8 | 8 |
| Dibutyl phthalate | 7 | 7 | 7 | 7 | 7 | 7 | 7 | 7 | 7 | 7 | 7 |
| Properties: | | | | | | | | | | | |
| Working life | 1 | ½ | 1½ | 1½ | ½ | ⅓ | ½ | ⅓ | | 1½ | ⅔ |
| Track-free set time | 1¾ | | ⅓ | ¼ | | ½ | 1 | 1 | | ½ | 2 |
| Cure time | <16 | <16 | ½ | ¼ | ⅔ | <16 | 1 | 1 | 1 | ½ | <16 |
| Color | Yellow | | | White | | Yellow | | White | | | White |
| Shore A hardness: | | | | | | | | | | | |
| At 24 hours | 4 | 21 | 41 | 45 | 33 | 2 | 32 | 29 | 36 | 35 | 17 |
| At 5 days | | | | | | | 33 | 45 | | | 17 |

Thus, Tables I-IV demonstrate that a total parts by weight of the lead salt and the thiuram disulfide in the range of about 14 to about 32 based upon 100 parts of liquid polymer will produce light-colored elastomeric products. Also, surprisingly, when at least about one mole of alkyl thiuram disulfide is used per mole of polymer with varying amounts of the lead salt on the order of about 8 to 24 parts by weight per 100 parts polymer, a white cured elastomeric solid is produced within a period of about 1 to about 16 hours at room temperature. Thus, with a formulation consisting essentially of about 8-24 parts of the lead compound, about 6 to about 8 parts of the TMTD and 100 parts of the liquid polymer, a good cure is effected having a white color. Amounts of total curing ingredients below about 20 per 100 parts by weight of polymer tend to provide softer cures, in general; and above about 32 total parts by weight results are not substantially improved. It is to be emphasized, however, as the tables demonstrate, that the ingredients of the curing system can be used over a wide range of proportions based upon the total weight of the polymer and also with varying ratios to obtain relatively soft or hard cures as one of ordinary skill in the art will readily appreciate. As mentioned above, the hardness of the cure is not the only criterion of the quality and for certain purposes relatively soft cures are desirable, particularly when they retain their adherency. Moreover, hardnesses of the softer product can be increased with fillers or by varying the proportions of the curing agent. So that if plastic, putty-like tack-free solid products are desired for caulking or architectural purposes, softer cures may be obtained in accord with the principles of this invention.

Fillers such as siliceous fillers sold under the trade name "Hi Sil #233" and other fillers such as calcium carbonate may be used in the tables of examples to increase the toughness of the cured product and reduce cost. In general, fillers take no part in the cure, although they may influence the rate and state of cure if they are not neutral as to acidity or alkalinity. Thus, a particular filler may tend either to reduce or to lengthen the pot life of the polymer to which the curing agents have been added, depending on its pH. Also, accelerators and retarders which are compatible with the curing system of this invention are envisioned to be within the scope hereof.

The basic lead salts used in accordance with this invention derive their basicity by their PbO content in excess of that stoichiometric amount of lead present in the formation of the organic or inorganic salts. As previously mentioned, when these basic lead salts or normal lead salts are combined with the thiurams, the combination has an apparently enhanced cumulative effect.

In the foregoing tables, the organic curing additive used was tetramethyl thiuram disulfide, which is available commercially. Other alkyl thiuram polysulfides may be used as the organic component of the curing additives in place of TMTD, for example, tetraethyl thiuram disulfide (TETD). This curing system is compared with the TMTD curing system in the following Table V.

TABLE V.—BASIC LEAD SILICATE WITH METHYL AND ETHYL THIURAM DISULFIDES

| Stock formulation Example | 52 | 53 | 54 | 55 | 56 | 57 |
|---|---|---|---|---|---|---|
| LP-2 liquid polymer | 100 | 100 | 100 | 100 | | |
| LP-32 liquid polymer | | | | | 100 | 100 |
| Dibutyl phthalate | 10 | 10 | 7 | 7 | 10 | 10 |
| Basic lead silicate | 20 | 20 | 8 | 8 | 20 | 20 |
| Tetramethyl thiuram disulfide | 8 | | 8 | | 6 | |
| Tetraethyl thiuram disulfied | | 9.9 | | 8 | | 8 |
| Properties: | | | | | | |
| Working life | 1 | ¾ | ⅚ | 1½ | 1 | ¾ |
| Tack-free set time | 5 | 2¾ | 1½ | 4 | 24 | 6 |
| Cure time | 16 | 4½ | 1½ | 4 | 5 | 6 |
| Color | White | Cream | Cream | (¹) | Cream | Cream |
| Shore A hardness: | | | | | | |
| At 24 hours | 22 | 28 | 15 | 20 | 25 | 25 |
| At 1 week | 25 | 30 | | | 27 | 25 |

¹ Light buff.

Tetraethyl thiuram disulfide is about equally as effective as the tetramethyl form, both from the standpoint of curing activity and product color. Table V also demonstrates that LP-32 polymer, above identified can be employed instead of the LP-2 polymer with similar results.

In each of the foregoing examples, as mentioned, a curing paste was first prepared, comprising a mixture of the thiuram and the lead composition together with DBP as a vehicle or dispersing agent, and this curing paste was then added to the polysulfide polymer to initiate curing. It is contemplated that in commercial practice, a prepared paste of the lead salt and the thiuram may be manufactured and sold for addition to the liquid polymer at the point and time of use. This is advantageous, because the pot life of the mixture once added to the polymer is relatively short. The curing additive may be prepared in the form of a paste, or as a mixed dry powder. Those skilled in the art will understand that the lead salt may be incorporated into the polymer, if desired, without the addition of dibutyl phthalate or other vehicles to convert the salt to a paste.

It will be seen that the hardness of the cured product does not always increase with increasing concentrations of both the thiuram and the lead composition. It is very difficult if not impossible to specify for all types of polysulfide liquid polymers the precise numerical ranges in which the additives can be used, but the appropriate proportions to obtain a given a degree of hardness and/or other physical properties can be determined by routine tests by following the criteria set forth herein.

Tables VI and VII demonstrate that normal lead salts or organic and inorganic acids, respectively, can be employed as the lead composition in combination with the alkyl thiuram disulfide to obtain white or light-colored cured solid products in short periods of time at room or ambient temperatures. In general, the normal lead salts of organic and inorganic acids in combination with the alkyl thiuram disulfides cure at a faster rate than the basic lead salts as demonstrated in the previous Tables I through IV. Also, when firm light-colored solid cured products are desired, the tables demonstrate that about 6 to about 8 parts by weight of the thiuram disulfide can be employed where the lead salt is present in varying amounts of about 8 to about 24 parts by weight, both of the amounts based upon 100 parts by weight of liquid polymer. Moreover, it has been discovered that when normal lead carbonate and hydrated normal lead borate are employed, for example, in Examples 72 and 78, the cured product is a sponge. In the case of Example 72, the resultant solid cured product corresponded to a 100% expansion of the starting materials of the stock formulation. In the case of Example 78, the use of hydrated normal lead borate resulted in a 50% expansion of the stock formulation starting materials. Also, basic lead carbonate and dehydrated normal lead borate may be employed to produce sponge cured products.

order of about 1 to about 24 hours at room or ambient temperatures to produce a solid cured product having an elastomeric or plastic state. In all of the above specific examples of the tables, the cured products were elastomeric. Experiments have been performed, however, in an effort to advance a plausible theory to explain the unique results of the white products achieved according to this invention. Apparently, the thiuram disulfides somehow prevent the formation of a deep yellow lead mercaptide of the thiol-terminated polymer groups. Whatever the theory, the data and examples show that a white cured product results when about one mole or more of the alkyl thiuram disulfide per mole of the liquid organic polythiopolymercaptan polymer is employed with the normal and basic lead salts when such salts are present over a wide range of amounts.

In view of the above description and numerous examples, it will become obivous to those of ordinary skill in the art that other modifications thereof may be made without departing from the true spirit and scope of this invention.

What is claimed is:

1. The method of curing a liquid organic polythiopolymercaptan polymer having the recurring unit —RSS— wherein R is an organic radical and S is sulfur and having an average molecular weight in the range on the order of about 500 to about 25,000 which comprises, adding to the polymer a curing system which consists essentially of an alkyl thiuram polysulfide and at least one lead salt selected from the class consisting of a basic lead salt, a normal lead salt and mixtures thereof to produce a light-colored cured solid product at room temperature.

2. The method of claim 1 wherein said alkyl thiuram polysulfide is an alkyl thiuram disulfide.

TABLE VI

| Stock formulation Example | 58 | 59 | 60 | 61 | 62 | 63 | 64 | 65 | 66 | 67 | 68 |
|---|---|---|---|---|---|---|---|---|---|---|---|
| LP-2 liquid polymer | 100 | 100 | 100 | 100 | 100 | 100 | 100 | 100 | 100 | 100 | 100 |
| Normal lead salicylate | 8 | 12 | 16 | 20 | 8 | 12 | 16 | 20 | 24 | | |
| Normal lead acetate | | | | | | | | | | 8 | |
| Normal lead oxalate | | | | | | | | | | | 24 |
| Dibutyl phthalate | 7 | 7 | 14 | 21 | 7 | 10 | 14 | 21 | 7 | 7 | 7 |
| TMTD | 6 | 6 | 6 | 6 | 8 | 8 | 8 | 8 | 8 | 8 | 6 |
| Properties: | | | | | | | | | | | |
| Working life | ⅙ | ⅙ | <½₀ | <½₀ | ½₀ | <½₀ | <½₀ | <½₀ | ½₀ | ¼ | <16 |
| Tack-free set time | >3 | >3 | <½₀ | <½₀ | >2⅓ | ½₂ | ½₂ | <½₀ | <½₀ | ¼ | >24 |
| Cure time | >3<18 | >3<18 | ½ | <½₀ | >2⅓ | ⅓ | ⅙ | <½₈ | ¼ | ½₈ | >24 |
| Color | (¹) | (¹) | (²) | Yellow | (³) | (¹) | (¹) | (¹) | (⁴) | (³) | (²) |
| Shore A hardness: | | | | | | | | | | | |
| At 24 hours | 21 | 8 | 20 | 22 | 16 | 15 | 18 | 14 | 15 | 8 | 12 |
| At 8 days | | | 24 | | | | | | | | |
| At 22 days | 41 | 40 | | | | | | | | | |
| At 40 days | | | | | | | | | | 5 | |
| At 63 days | | | | | | 10 | | | | | |
| At 92 days | | | | | | 6 | | | | | |

¹ Light cream.  ² Light yellow.  ³ Dark cream.  ⁴ Medium cream.

TABLE VII

| Stock formulation Example | 69 | 70 | 71 | 72 | 73 | 74 | 75 | 76 | 77 | 78 | 79 |
|---|---|---|---|---|---|---|---|---|---|---|---|
| LP-2 liquid polymer | 100 | 100 | 100 | 100 | 100 | 100 | 100 | 100 | 100 | 100 | 100 |
| Normal lead sulfate | 8 | | | | | | | | | | 2 |
| Normal lead chloride | | 8 | 24 | | | | | | | | |
| Normal lead carbonate | | | | 8 | | | | | | | |
| Normal lead sulfite | | | | | 8 | 24 | | | | | |
| Normal lead silicate | | | | | | | 8 | 24 | | | |
| Hydrated normal lead borate | | | | | | | | | 24 | 24 | |
| Dibutyl phthalate | 7 | 7 | 7 | 7 | 7 | 7 | 7 | 7 | 7 | 7 | 7 |
| TMTD | 8 | 8 | 8 | 8 | 8 | 8 | 8 | 8 | 6 | 7 | 7 |
| Properties: | | | | | | | | | | | |
| Working life | ¼ | ¼ | ⅙ | ½ | >3<5 | >3<18 | ½ | ¼ | ½ | ⅙ | >5 |
| Tack-free set time | ¼ | ¼ | ⅓ | ½ | >3<5 | >3<18 | ½ | ¼ | 1¼ | 1¼ | >5 |
| Cure time | ¼ | ¼ | ½ | ½ | >5 | >3<18 | ½ | ¼ | 1½ | 1½ | <16 |
| Color | (¹) | (²) | Natural | (³) | (⁴) | (³) | (⁴) | (²) | (⁵) | (⁶) | Natural |
| Shore A hardness: | | | | | | | | | | | |
| At 24 hours | 3 | 10 | 85 sponge | | 10 | 15 | 22 | 10 | 26 | 15 | 5 |
| At 15 days | | | | | | | | | | | |
| At 40 days | 4 | 13 | 5 sponge | | 15 | 48 | 25 | 14 | 45 | 15 sponge | 7 |

¹ Dark cream.  ² Dark cream to natural.  ³ Light cream.  ⁴ Light grey to natural.  ⁵ Yellow white spots.  ⁶ White.

As stated above, the exact mechanism for curing the liquid polythiopolymercaptan polymers of this invention with the unique combination of curing ingredients is not completely understood. Yet, as the above results demonstrate, empirically liquid organic polythiopolymercaptan polymers can be cured in short periods of time on the 3. The method of claim 1 wherein about one or more moles of said alkyl thiuram polysulfide is present per mole of said liquid organic polythiopolymercaptan polymer.

4. The method of claim 2 wherein the lead salt is selected from the group consisting of basic lead silicate, basic lead sulfate, basic lead borate, basic lead phthalate, normal lead sulfate, normal lead chloride, normal lead carbonate, normal lead sulfite, normal lead silicate, normal lead borate, normal lead salicylate, normal lead acetate, normal lead oxalate, and mixtures thereof.

5. The method of claim 2 wherein the alkyl thiuram disulfide is selected from the class consisting of tetramethyl and tetraethyl thiuram disulfide and mixtures thereof.

6. The method of claim 2 wherein said polymer has an average molecular weight greater than about 1000.

7. The method of claim 2 wherein about one or more moles of said alkyl thiuram disulfide is present per mole of said liquid organic polythiopolymercaptan polymer.

8. The method of curing a liquid organic polythiopolymercaptan polymer having the recurring unit —RSS— wherein R is an organic radical and S is sulfur and having an average molecular weight in the range on the order of about 500 to about 25,000 which comprises, adding to the polymer a curing system consisting essentially of an alkyl thiuram disulfide and at least one lead salt selected from the class consisting of a basic lead salt, a normal lead salt and mixtures thereof wherein said disulfide is present in an amount of about 6 to about 8 parts by weight and said lead salt is present in an amount of about 8 to about 24 parts by weight, both said amounts based upon about 100 parts by weight of said polymer, a light-colored cured solid product thereby being produced in a period of between about 1 and about 24 hours at room temperature.

9. The method of claim 8 wherein said polymer has an average molecular weight in the range on the order of about 4000 to about 25,000 and viscosities within the range of about 400 to about 100,000 centipoises.

10. The method of claim 9 wherein said disulfide is selected from the class consisting of tetramethyl and tetraethyl thiuram disulfide and said lead salt is selected from the class consisting essentially of basic lead silicate, basic lead sulfate, basic lead borate, basic lead phthalate, normal lead sulfate, normal lead chloride, normal lead carbonate, normal lead sulfite, normal lead silicate, normal lead borate, normal lead salicylate, normal lead acetate, normal lead oxalate, and mixtures thereof.

11. The method of claim 10 wherein the lead salt is normal or basic lead carbonate and the solid product is a sponge.

12. The method of claim 10 wherein the lead salt is hydrated normal lead borate and the solid product is a sponge.

References Cited
UNITED STATES PATENTS

| | | | |
|---|---|---|---|
| 2,466,963 | 4/1949 | Patrick et al. | 260—79.1 |
| 3,036,049 | 5/1962 | Leuchten et al. | 260—79.1 |
| 3,219,638 | 11/1965 | Warner | 260—79 |
| 3,225,017 | 12/1965 | Seegman et al. | 260—79.1 |

DONALD E. CZAJA, Primary Examiner

M. I. MARQUIS, Assistant Examiner

U.S. Cl. X.R.

117—124 E, 135.1, 138.8 A, 139.5 A, 143 A; 260—31.8 Z, 33.8 R, 37 R, 79.1 R

UNITED STATES PATENT OFFICE
CERTIFICATE OF CORRECTION

Patent No. 3,629,206　　　　　　Dated December 21, 1971

Inventor(s) Harry B. Stephenson

It is certified that error appears in the above-identified patent and that said Letters Patent are hereby corrected as shown below:

Col. 4, line 47 change "reects" to --reflects--.

Col. 7, Table IV Working Life, Cols. 43 & 44 change "1 1/2" to --1/12; Col. 7, Table IV change "Track-free to --Tack-free--;

Col. 8, Table IV Working Life, Col. 47 change "1/-" to --1/6--; Col. 8 Table IV Working Life, Col. 50 change "1 1/2" to --1/12; Col. 8, Table IV, Tack-free set time, Col. 50 change "1/6" to --1/3--; Col. 8, Table IV At 5 days, Col. 48 change "45" to --35--; --; Col. 8, line 75 after given delete "a".

Col. 9, Table VI At 22 days, Col. 58 change "41" to --31--; Col. 9, Table VI At 22 days, Col. 59 change "40" to --30--; Col. 9, Table VII At 24 hours, Col. 71 change "85 sponge" to --8--; Col. 9, Table VII At 40 days, Col. 72 insert --5 sponge Col. 10, Table VI Working Life, Col. 62 change "1/20" to --1/2--; Col. 10, Table VI Working Life, Col. 66 insert -- < -- before 1/20; Table VI, Col. 10 Cure Time, Col. 65 change "1/28" to --1/20--; Col. 10, Table VI Cure Time, Col. 66 change "1/4" to --<1/20--; Col. 10, Table VI Cure Time, Col. 67 change "1/28 to --1/4--; Col. 10 Table VI At 24 hours, Col. 65 change "14" to --13--; Col. 10, Table VII At 40 days, Col. 77 change "45" to --35--.

Signed and sealed this 4th day of July 1972.

(SEAL)
Attest:

EDWARD M. FLETCHER, JR.　　　　　ROBERT GOTTSCHALK
Attesting Officer　　　　　　　　Commissioner of Patents